United States Patent [19]

Kucheran et al.

[11] Patent Number: 4,774,579
[45] Date of Patent: Sep. 27, 1988

[54] APPARATUS FOR QUANTIFYING VIDEO IMAGES OF LIGHT BEAMS

[76] Inventors: Duane A. Kucheran, #405 4353 Halifax St., Burnaby, B.C.; Derek M. Stuart, 407 1755 Roasom, Vancouver, B.C., both of Canada

[21] Appl. No.: 924,976

[22] Filed: Oct. 30, 1986

[51] Int. Cl.⁴ .................. H04N 5/14; H04N 7/00; G06K 9/38

[52] U.S. Cl. .................. 358/160; 358/13; 358/96; 382/50; 341/200

[58] Field of Search .................. 382/50, 53; 358/160, 358/162, 163, 169, 13, 96, 283; 340/347 AD

[56] References Cited

U.S. PATENT DOCUMENTS

| | | | |
|---|---|---|---|
| 4,120,589 | 10/1978 | Mima et al. | 358/96 |
| 4,240,107 | 12/1980 | Yoshida | 358/96 |
| 4,251,802 | 2/1981 | Horna | 358/13 |
| 4,554,583 | 11/1985 | Saitoh et al. | 358/163 |
| 4,578,715 | 3/1986 | Yamaguchi | 358/283 |
| 4,742,554 | 5/1988 | Tsuda | 382/50 |

*Primary Examiner*—James J. Groody
*Assistant Examiner*—Michael D. Parker

[57] ABSTRACT

The present invention relates to a device which replaces a video image of a light beam with a quantized image, having contours corresponding to preset intensity percentages. The continuous analog video waveform is replaced by a stepped waveform, resulting in contours to appear on the video image. These contours can be preset to appear at the common percentages of the maximum. The most useful contours are at 90%, 50%, 37% (corresponding to 1/e of intensity), 14% (corresponding to $1/e^2$ of intensity) and 10%. A normalizing circuit makes the contours independent of light level.

2 Claims, 1 Drawing Sheet

APPARATUS FOR QUANTIFYING VIDEO IMAGES OF LIGHT BEAMS

BACKGROUND OF THE INVENTION

This invention relates to monitoring light beams, mainly from lasers, using video cameras and monitors. It enhances the displayed video image and makes it more meaningful. It overcomes the problems caused by subjective juegement of the beam parameters.

DESCRIPTION OF PRIOR ART

Many light beams are viewed with video equipment, in particular invisible light from infra-red laser diodes. It is often difficult to judge the shape and diameter of the light beam since the size of the displayed image changes with changing the light intensity. It is the purpose of this invention to display the beam shape and diameter independent of light level. A further advantage of this invention is that it replaces the blurred appearance of many beams with a crisp quantized version which is easier to use.

SUMMARY OF THE INVENTION

The present invention processes the video signal from a video camera looking at light beams. The invention replaces the continuous analog video signal with a signal quantized to five levels: The part of the signal which represents light intensities over 90% is replaced with a fixed 100% of full scale output. The part which represents intensities over 50% is replaced with a fixed 80% of full scale output. The part which represents over 37% (1/e) is replaced with a 60% of full scale output, over 14% (1/e) is replaced with a 40% of full scale output, over 10% is replaced with 20% of full scale output and under 10% is replaced with a zero output. These quantized contours are independent of the light level over a wide range of intensities. It is an object of this invention to display video images of light beams without their usual blurred appearance and display their major feature independent of intensity. A further object of the invention is to enable the measurement of the light beam diameter.

BRIEF DESCRIPTION OF THE DRAWINGS

In the drawings which illustrate the embodiments of the invention.

DESCRIPTION OF THE PREFERRED EMBODIMENT

Figure 1:
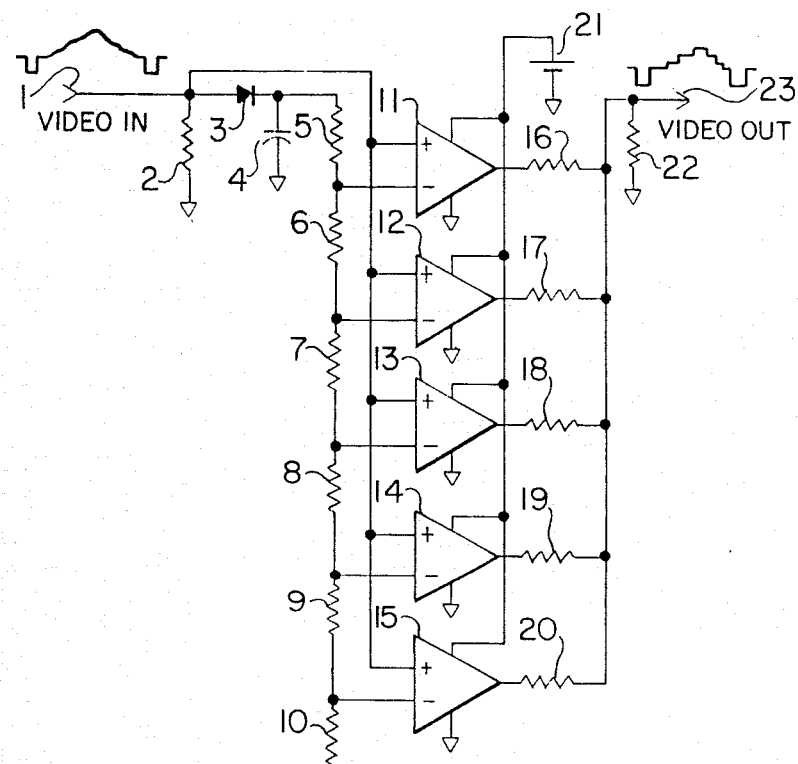
FIG. 1 is a schematic diagram of the electronic circuit in the particular embodiment shown.

FIG. 1 illustrates in schematic form the preferred embodiment. The signal from a video camera enters via connector 1, is terminated by a matching resistor 2 and its peak value is being detected by diode 3 and capacitor 4. Resistor network 5,6,7,8,9,10 divides the peak value into five values corresponding to 10%, 14%, 37%, 50% and 90% of the peak value. These values are connected to the reference input of comparators 11,12,13,14,15. The input video signal is connected to the input terminal of the same comparators. All comparators are powered from power source 21. The outputs of the comparators are summed together into resistor 22 using output resistors 16,17,18,19,20.

The combination of resistor 22 and resistors 16,17,18,19,20 has an equivalent impedance of about 75 ohms. Resistor 2 is also 75 ohms in order to match the impedance of the video signals used. The time constant of capacitor 4 and the sum of resistors 5,6,7,8,9,10 is about two seconds.

Figure 2A:
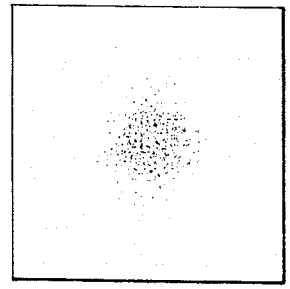
FIGS. 2A and 2B are illustrations of the appearance of the video display before and after the invention is used, respectively.
Figure 2B:
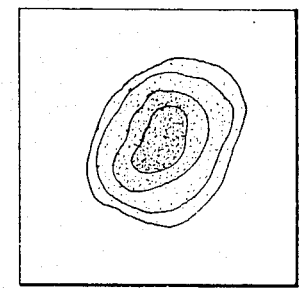

In operation the video signal enters as a continuous analog signal corresponding to the video image shown in FIG. 2-a. After being quantized by the pre-set thresholds of 10%, 14%, 37%, 50%, and 90% the appearance of the video image after processing is shown in FIG. 2-b. This image form displays directly the relevant light beam contours. Since the comparator thresholds are proportional to the peak value of the video signal, the contours are largely independent of the actual light level.

What is claimed is:

1. A video signal processing unit for quantifying images of light beams which replaces an analog video signal with one having a plurality of fixed steps, each one of said steps corresponding to a fixed fraction of the peak amplitude of said analog video signal in a way which is largely independent of signal level, comprising:

a peak detecting circuit for holding the peak of said analog video signal;

a resistive voltage divider connected across the output of said peak detecting circuit and dividing it into a plurality of fixed steps proportional to the value of the resistors used in said resistive divider;

a plurality of comparators used to compare said fixed steps to the instantaneous value of said analog video signal;

and a resistive summing network for summing the outputs of said comparators into an output video signal.

2. A video signal processing unit as described in claim 1 where the number of said steps is five and they are set at 10%, 14%, 37%, 50% and 90% of peak video level

* * * * *